UNITED STATES PATENT OFFICE.

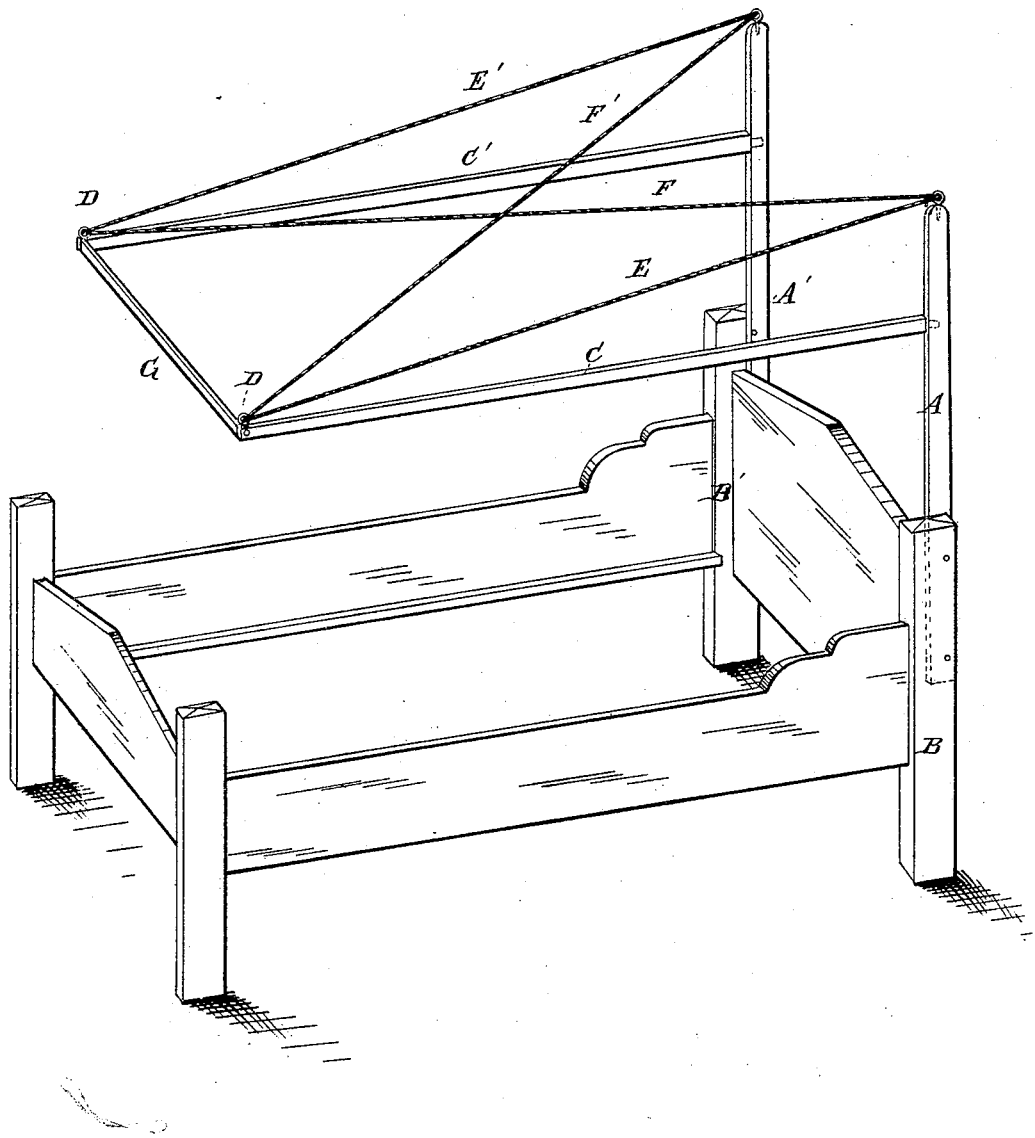

ALFRED H. BAILEY, OF PALESTINE, TEXAS.

MOSQUITO-NETTING FRAME.

SPECIFICATION forming part of Letters Patent No. 238,550, dated March 8, 1881.

Application filed July 9, 1880. (No model.)

*To all whom it may concern:*

Be it known that I, ALFRED H. BAILEY, of Palestine, in the county of Anderson and State of Texas, have invented a new and Improved Mosquito-Netting Frame, of which the following is a specification.

The object of my invention is to provide a new and improved mosquito-netting frame for bedsteads, which is simple in construction, light, durable, and convenient.

The invention consists of a mosquito-netting frame formed of two longitudinal rods removably fastened to uprights attached to the bed-posts, and held by cords or wires passing from the outer ends of each of said longitudinal rods to the top of each upright. A transverse rod or bar is removably attached to the outer ends of said longitudinal bars or rods.

In the accompanying drawings a perspective view of a bedstead provided with my improved mosquito-netting frame is shown.

An upright, A or A', is attached to each of the upper bed-posts, B B', in some suitable manner. The said uprights are provided with a mortise a short distance from the upper end to receive a tenon on the end of a bar or rod, C or C', the other ends of which are provided with a ring, loop, aperture, or hook, D D', in which cords or wires E E' and F F' are fastened, which cords or wires pass to the upper ends of the uprights A A', where they are fastened in rings, loops, or apertures, a cord or wire passing from the top of each upright A A' to the end of each bar or rod C', and the cords F and F' crossing each other, as shown. The rods or bars are provided with a mortise on the inner side, at or near the outer ends, into which mortises the tenons of a transverse bar or rod, G, fit. The mosquito-netting and bar are supported by the cords E E and F F, the bars or rods C C' and G only serving as braces to stiffen the frame. The load is not supported by the rods C C', but by the uprights A A'.

The entire frame can easily be folded by removing the transverse bar G and drawing the tenons of the longitudinal bars C C' out of their sockets, and the frame can be built up just as rapidly.

The uprights may be attached to the upper or lower bed-posts, as may be desired.

Having thus described my invention, what I claim as new, and desire to secure by Letters Patent, is—

The combination, with the uprights A A' and detachable brace-frame C C' G, of the straight cords E E' and crossed cords F F', fastened at one end to the tops of the uprights A A', and at the other end looping over pins on the bar G, as shown and described, whereby the simple lifting of bar G allows the brace-frame to be detached from the cords and uprights.

ALFRED H. BAILEY.

Witnesses:
JOSIAH MARTIN,
J. B. MCKNIGHT.